(12) United States Patent
Håkansson et al.

(10) Patent No.: US 7,764,434 B2
(45) Date of Patent: Jul. 27, 2010

(54) WEAPON SIGHT

(75) Inventors: Håkan Håkansson, Lund (SE); Ralf Wiklund, Ödåkra (SE)

(73) Assignee: GS Development AB, Malmo (SE)

( * ) Notice: Subject to any disclaimer, the term of this patent is extended or adjusted under 35 U.S.C. 154(b) by 0 days.

(21) Appl. No.: 11/012,314

(22) Filed: Dec. 16, 2004

(65) Prior Publication Data

US 2005/0225853 A1 Oct. 13, 2005
US 2010/0039702 A9 Feb. 18, 2010

Related U.S. Application Data

(63) Continuation of application No. PCT/SE03/01069, filed on Jun. 23, 2003.

(30) Foreign Application Priority Data

Jun. 24, 2002 (SE) .................................... 0201932

(51) Int. Cl.
G02B 27/14 (2006.01)
G02B 23/00 (2006.01)
(52) U.S. Cl. ........................ 359/638; 359/399; 359/429; 42/113
(58) Field of Classification Search ......... 359/399–429, 359/694–706; 42/119–131; 356/251–255; 33/265, 297
See application file for complete search history.

(56) References Cited

U.S. PATENT DOCUMENTS

| | | | | |
|---|---|---|---|---|
| 2,596,522 A | * | 5/1952 | Bethke | ........................ 42/113 |
| 3,942,901 A | | 3/1976 | Ekstrand | ...................... 356/251 |
| 3,951,553 A | * | 4/1976 | Oberheuser | .................. 356/251 |
| 4,402,605 A | * | 9/1983 | Ekstrand | ...................... 356/252 |
| 4,665,622 A | * | 5/1987 | Idan | .............. 42/113 |
| 4,919,528 A | * | 4/1990 | Pitalo et al. | .................. 359/406 |
| 5,118,186 A | | 6/1992 | Schratzenstaller et al. | .. 356/153 |
| 5,205,044 A | | 4/1993 | DePaoli | ........................ 42/132 |
| 5,383,278 A | * | 1/1995 | Kay | ............................ 33/265 |
| 5,452,131 A | | 9/1995 | Jorlov | .......................... 359/638 |
| 6,154,971 A | * | 12/2000 | Perkins | ........................ 33/265 |
| 6,283,862 B1 | * | 9/2001 | Richter | ........................ 463/51 |

FOREIGN PATENT DOCUMENTS

| | | |
|---|---|---|
| GB | 2292465 | 2/1996 |
| WO | WO 9919665 | 4/1999 |
| WO | WO 02055950 | 7/2002 |

* cited by examiner

Primary Examiner—Thong Nguyen
(74) Attorney, Agent, or Firm—Capitol City TechLaw

(57) ABSTRACT

A weapon sight of the kind comprising a lens having a partially reflecting surface, a light source spaced from the lens for emitting light towards the reflecting surface to produce a light spot by direct imaging of the light source on the surface to be superimposed on a target when sighting through the lens. For adjustment of the location of the light spot on the reflecting surface when observed from a defined fixed position, the sight includes a device for displacement of the light source, comprising a miniature drive motor or element operatively connected with the light source.

6 Claims, 4 Drawing Sheets

WEAPON SIGHT

CROSS REFERENCE TO RELATED APPLICATIONS

This application is a continuation application of International Application No. PCT/SE2003/001069, which was filed Jun. 23, 2003, and which was published in English.

FIELD OF THE INVENTION

The invention relates to a weapon sight to be used on rifles, guns, and machine guns.

The weapon sight is of the kind comprising a lens having a partially reflecting surface; a light source spaced from the lens for emitting light towards said reflecting surface to produce a light spot by direct imaging of said light source on said surface to be superimposed on a target when sighting through the lens; and means for adjustment of the location of the light spot on the reflecting surface when observed from a defined fixed position, by displacement of the light source.

A weapon sight of the kind referred to is disclosed in GB-A-2 292 465.

Usually, the lens is located at one end of a light channel formed by an elongate housing, and the light source is located in the channel. At sighting, the light spot and the target are observed through the light channel from the other end thereof.

BACKGROUND OF THE INVENTION

If the sight at zeroing has been calibrated for a distance from the weapon (sight) to the target of 100 m the ballistic curve of the projectile and the sight line will intersect at the distance 100 m. At very short range (up to 20 m, depending on the distance between the weapon barrel of the and the sight), the ballistic curve will pass under the sight line; between 20 m and 100 m, the ballistic curve will pass over the sight line, whereas the ballistic curve will pass under the sight line at distances longer than 100 m.

It is desired to compensate automatically for said deviation at other distances than that the sight has been calibrated for by zeroing. However, weapons are used not only for shooting more or less horizontally but also for shooting at an angle upwards or, more often, downwards e.g. from a helicopter. Also a moving target may be aimed at. It is therefore desired to adjust the sight automatically not only for the different distances to the target but also in dependence of the different parameters involved in sighting under the conditions mentioned. At the present state of the art miniature range finders of infrared type as well as miniature angular gauges are available. The present state of the art also includes binoculars with integrated compass. Measurement of the direction in which the shooter is aiming in combination with measurement of the distance to a moving target enables calculation of the speed at which the target moves. Alternatively, the speed can be measured by GPS (global positioning system). With the parameters easily available the aiming point can be controlled in dependence thereof in order to have the weapon directed in different positions towards a target, even towards a moving target, located at different distances from the shooter. However, control of the aiming point by mechanical adjustment thereof to different positions in different directions in dependence of said parameters involves great complications.

BRIEF SUMMARY OF THE INVENTION

The primary object of the invention is to provide a sight of the kind referred to above with increased possibilities to take into consideration several parameters simultaneously for automatic adjustment of the light spot vertically as well as horizontally.

A further object is to increase the precision and speed of the adjustment and to facilitate the use of the sight.

According to the invention these and other objects which will be apparent from the description which follows are achieved by a sight of the kind referred to herein, which comprises a lens having a partially reflecting surface; a light source spaced from the lens for emitting light towards said reflecting surface to produce a light spot by direct imaging of said light source on said surface to be superimposed on a target when sighting through the lens; and a miniature drive motor operatively connected with one of the light source and the lens for displacement of the light source or the lens, respectively, in one of two mutually perpendicular directions for adjustment of the location of the light spot on the reflecting surface when observed from a defined fixed position.

Further features of the invention are defined in the dependent claims.

BRIEF DESCRIPTION OF THE DRAWINGS

Illustrative embodiments of the sight of the invention will be described in more detail in the following description with reference to the accompanying drawings in which.

DETAILED DESCRIPTION OF THE INVENTION

Figure 1:
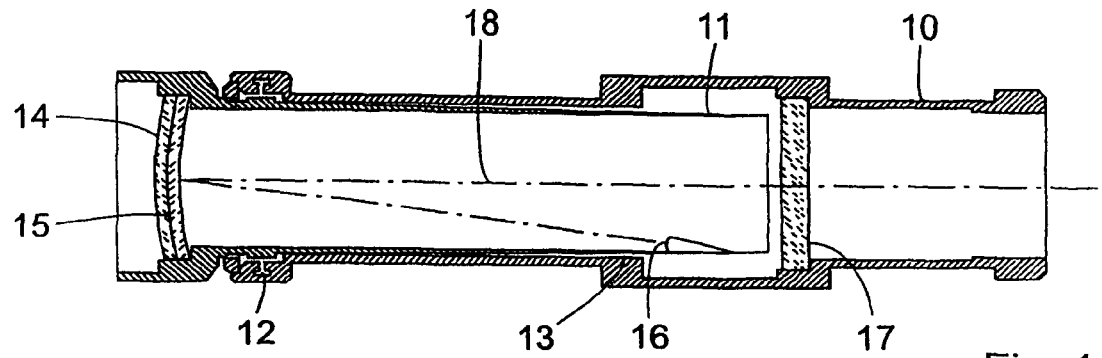
FIG. 1 is a diagrammatic axial cross sectional view of a weapon sight of the kind referred to herein.

The weapon sight disclosed in FIG. 1 is of a well known prior art embodiment comprising a light channel formed by an outer tube 10 to be fastened to the barrel, the breechblock, or a specially designed sight holder of a weapon on which the sight shall be used, and an inner tube 11 which is mounted in the outer tube at one end 12 and is fixed at the other end by adjustment means 13, allowing adjustment of the longitudinal axis of the inner tube horizontally and vertically in relation to the longitudinal axis of the outer tube as is necessary in order to adapt the sight to the weapon on which it is used. In said one end of the inner tube a double lens 14 is provided having a layer 15 between the lenses, said layer reflecting red light. Inside the inner tube a light source 16 e.g. an LED (Light Emitting Diode) or RCLED (Resonant Cavity Light Emitting Diode) is mounted to project a beam of red light with minimal dispersion on layer 15 where the light beam forms a red spot to be used as an aiming point. The light beam is reflected by the layer 15 through a face-ground glass plate 17 having an anti-reflection layer on the side thereof facing the right end of the light channel. Sighting takes place through the light channel formed by the inner tube from the right end thereof the sight line being indicated by a dot-and-dash line 18.

Figure 2:
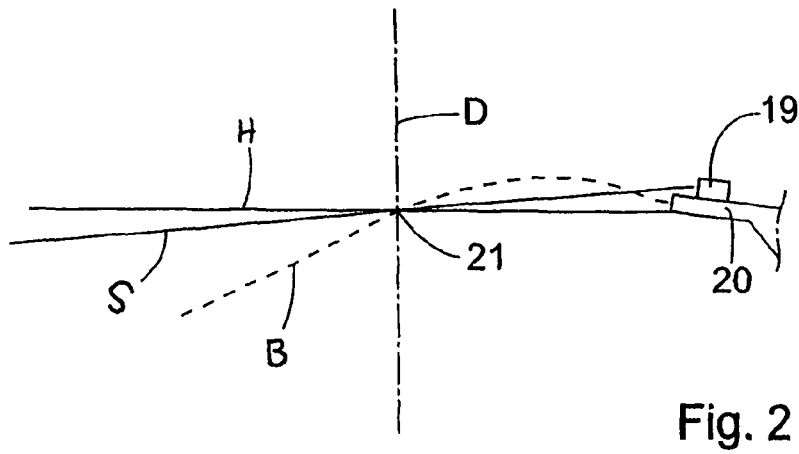
FIG. 2 is a graph showing the sight line and the ballistic curve of a projectile.

Adjustment of the sight at zeroing could be effected with the sight adjusted for a distance to the target of 100 m. Since the ballistic curve described by the projectile deviates downwards from the weapon along a parabola the sight should be adjusted such that the ballistic curve and the sight line intersect at the distance 100 m. This is illustrated in FIG. 2 wherein the horizontal is indicated at H, the sight line at S and the ballistic curve at B. The sight is shown at 19 and the barrel of the weapon on which the sight is mounted is fragmentarily shown at 20. The distance of 100 m from the weapon is indicated by a dash-dotted line D. The intersection between the sight line and the ballistic curve is indicated at 21.

If the sight line and the ballistic curve do not intersect at a distance of 100 m at zeroing of a weapon having a sight of the type disclosed in FIG. 1 the adjustment mechanism 13 is used to adjust the sight line to such position that the intersection will be located at 100 m. The adjustment mechanism is then calibrated so that it indicates a distance of 100 m.

In some cases, it is useful to adjust the sight so that the bullet will ram the target 3-5 cm above the line of sight at 100 m. By this, it is achieved that the shooter has got some security against misjudgment of the distance to the target; for most popular hunting and military caliber's, a zeroing according to the above will increase the useful range of the weapon up to about 230 m.

When the weapon with the sight described is being used at even longer distances, the light source has to be adjusted in order to have the sight line and the ballistic curve to intersect at the actual distance. However, the distance is only one parameter that has to be taken into consideration. Other parameters are the angle between the sight line and the horizontal, the speed of a moving target, influence of the wind, the speed of the projectile, the temperature of the air, and the type of ammunition used in the weapon.

At the present state of the art these parameters can be determined and be processed by a computer for controlling the position of the light source vertically and horizontally in dependence of the determined values of the parameters involved. Miniature drive motors such us piezoelectric or magnetostrictive motors or elements, stepping motors, and linear motors, are available today and are small enough to be integrated with a sight of the kind referred to herein.

Figure 3:
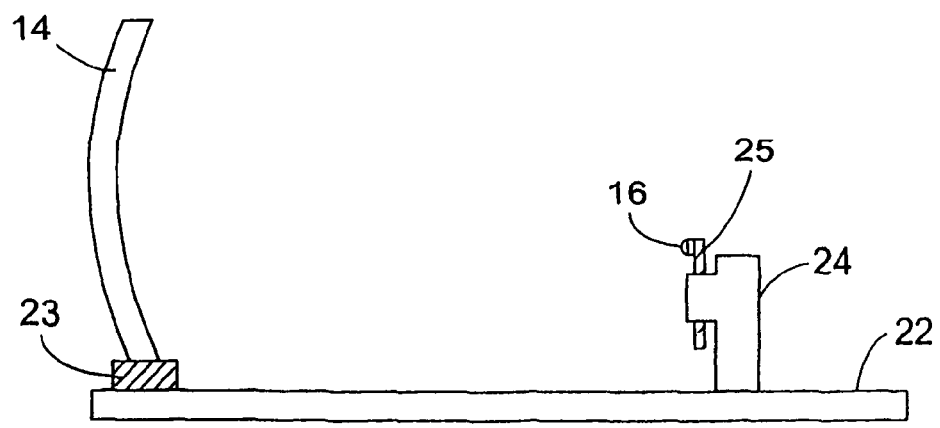
FIG. 3 is a diagrammatic side view of the weapon sight of the invention.

In FIG. 3 such integration is illustrated. On a mounting frame 22 which may be the tube 11 disclosed in FIG. 1 lens 14 with reflecting layer is mounted by means of a connection element 23. Light source 16 such as an LED or RCLED is mounted on frame 22 by means of a miniature motor 24 such as a piezoelectric motor including a slide 25 which is movable in the vertical direction the light source 16 being supported by the slide. The light source accordingly can be shifted vertically to different positions by means of the motor, and the operation of the motor is controlled by output signals from a computer so that the light spot generated by the light source when observed from a defined fixed position at the right end of the sight will be positioned automatically in dependence of relevant parameters supplied to the computer, such that the sight line will intersect the ballistic curve on the target.

Motor 24 can be located in a box at the lower side of frame 22 so that only slide 25 with light source 16 at the upper end thereof projects from the upper side of the frame.

Figure 4:
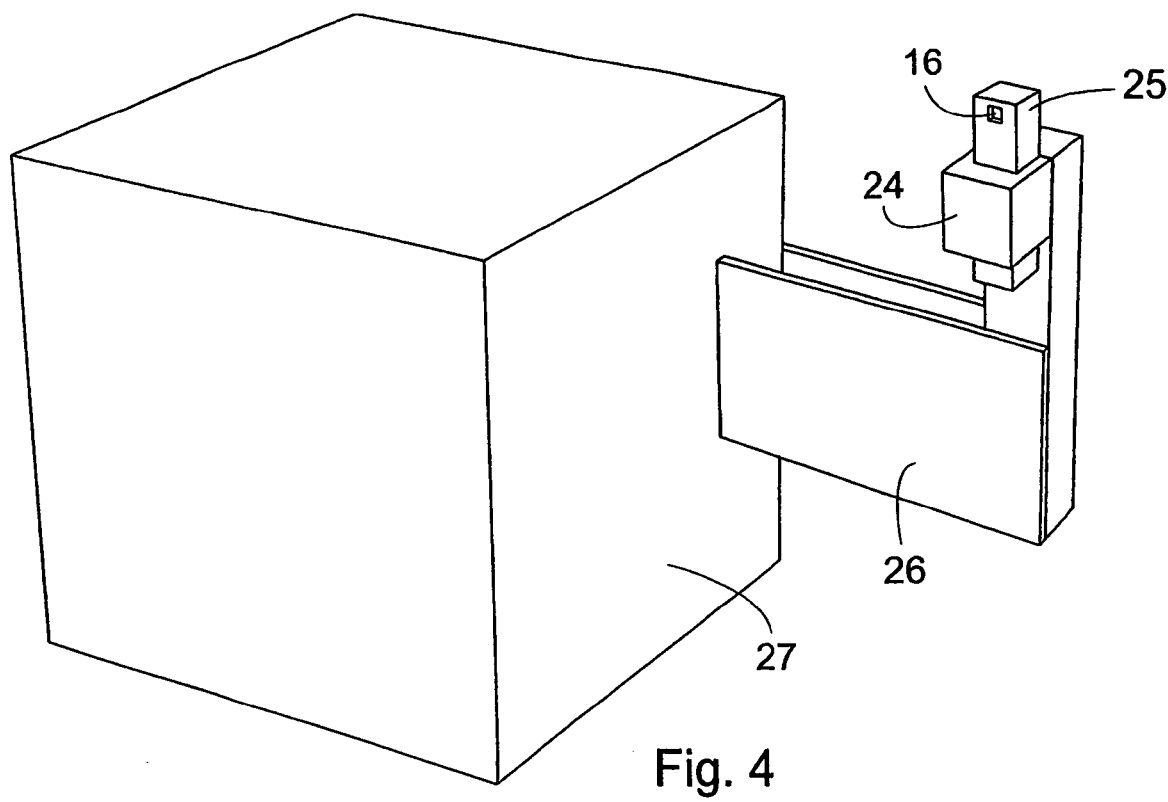
FIG. 4 is an enlarged perspective view of the light source and a supporting structure thereof according to a first embodiment of the invention

In FIG. 3, only the position along a vertical axis, the Y-axis, is controlled. In the embodiment disclosed in FIG. 4 motor 24 having light source 16 mounted to slide 25 thereof, also the position along a horizontal axis, the X-axis, is automatically controlled. In FIG. 4 motor 24 is mounted to the slide 26 of a second motor 27, slide 26 being movable along the X-axis by means of motor 27 while slide 25 is movable along the Y-axis by means of motor 24. Light source 16 accordingly can be adjusted in two mutually perpendicular directions by means of the two motors 24 and 27.

Figure 5:
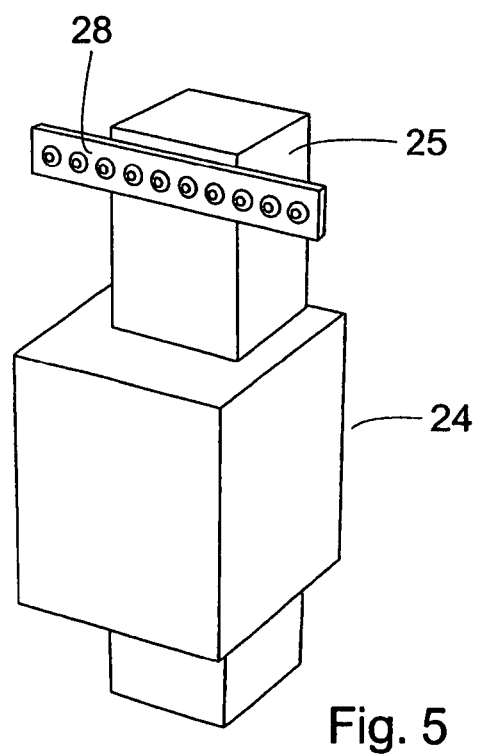
FIG. 5 is an enlarged perspective view of a light source comprising a diode array (VCSEL), and the supporting structure thereof according to a second embodiment of the invention.

The same result can be achieved by means of a single motor 24 if the light source is a diode array (Vertical Cavity Surface Emitting Laser, VCSEL) 28 mounted to slide 25 of motor 24, as shown in FIG. 5. The slide is movable by means of motor 24 along the Y-axis, and the diode array extends at right angles to slide 25, i.e. along the X-axis. In this case the position vertically is controlled by motor 24 while the position horizontally is controlled by activating the proper diode in diode array 28.

In a modification of this embodiment motor 24 is mounted with the associated slide 25 movable along the X-axis while diode array 28 extends along the Y-axis.

Figure 6:
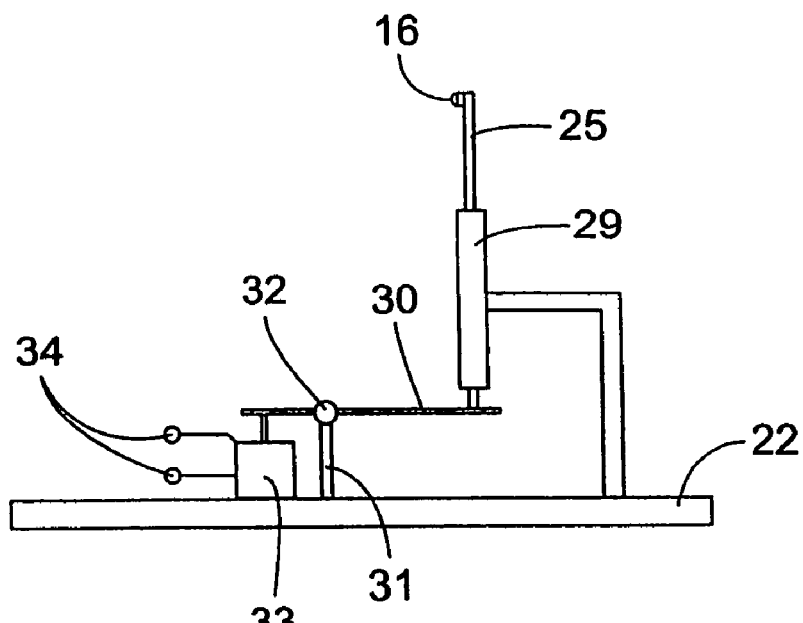
FIG. 6 is a diagrammatic view of the light source and the supporting structure according to a third embodiment of the invention.

In the embodiment disclosed in FIG. 6 slide 25, to which light source 16 is mounted, is displaceable axially in a tube 29 fixedly mounted to frame 22. A two-armed lever 30 is pivoted on a fixed support 31 at 32. One arm of the lever supports slide 25 at the lower end thereof, the other arm being engaged from below by a piezoelectric element 33 which is controlled by electric current supplied at 34. The piezoelectric element will be lengthened or shortened by the voltage applied to the element being changed, in order to adjust the vertical position of the light source.

The piezoelectric element 33 in the embodiment described with reference to FIG. 6 can be replaced by a magnetostrictive element.

Figure 7:
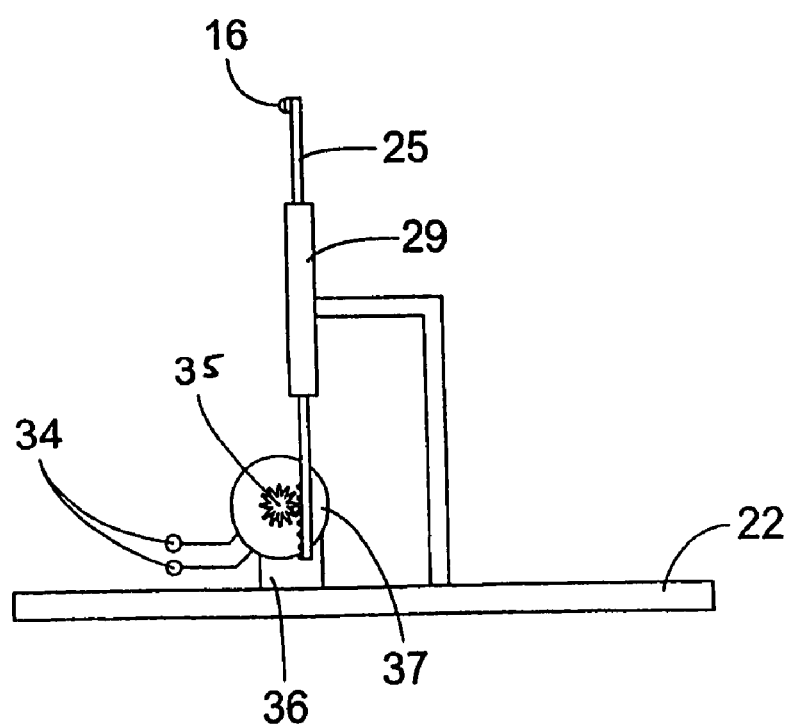
FIG. 7 is a diagrammatic view of the light source and the supporting structure according to a fourth embodiment of the invention.

In the embodiment according to FIG. 7, a pinion 35 on an electric stepping motor 36 engages a rack 37 on slide 25. Stepping motor 36 is energized at 34 to rotate in either direction in order to adjust the vertical position of light source 16 by axial displacement of slide 25 in tube 29.

Figure 8:
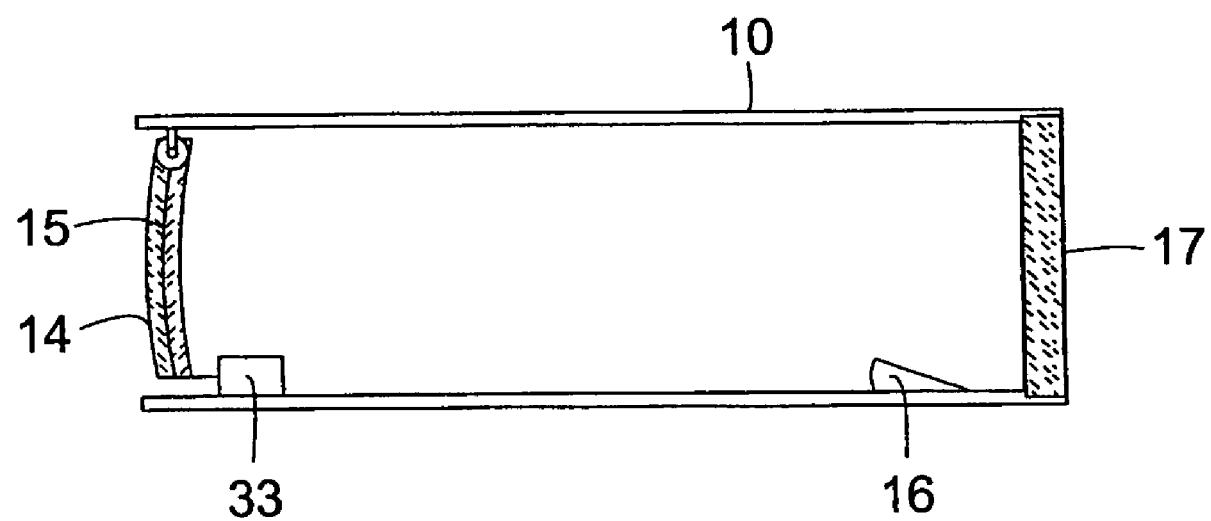
FIG. 8 is a diagrammatic view of another embodiment of the present invention.

In FIG. 8, another embodiment of an adjustable sight according to the present invention is shown. Here, the LED is fix in the tube 10, which tube simultaneously serves as an inner tube and as an outer tube. The sight adjustment is performed by changing the angle of the double lens 14 by means of the piezo-electric stack 33. In the embodiment shown, an elongation of the piezoelectric stack 33 will shift the sight line upwards, i.e. the bullet will hit the target on a lower spot. In another embodiment, the piezo-electric stack 33 is placed on the upper part of the tube 10, which will give a lower sight line when the piezo-electric stack is elongated, i.e. a higher bullet hit position. The embodiment according to FIG. 8 is advantageous in that the diameter of the tube 10 can be kept at a minimum. Obviously, the translation of the double lens 14 can be preformed by other means than a piezo-electric stack, e.g. all other linear movement means that have been described in connection with the other embodiments of the invention.

Finally, one further embodiment will be described. In some cases, it could be useful to combined the diode array of FIG. 5 with the movable lens of FIG. 8. By combining these two embodiments, side correction of the sight line can be achieved by lighting different diodes of the diode array, whereas horizontal correction of the sight line can be achieved by means of the movable lens. Of course, it is also possible to use both a moving light source and a moving lens.

Within the scope of the invention the embodiments described above may be combined in different ways, or one embodiment may be modified by guidance of another embodiment described herein.

The invention claimed is:

1. A weapon sight for a firearm comprising:
   a tube;
   a lens having a partially reflecting surface, the lens mounted on an inside of the tube;
   a light source mounted on the inside of the tube and being spaced from the lens for emitting light towards said reflecting surface to produce a light spot by direct imaging of said light source on said surface to be superimposed on a target when sighting through the lens; and
   a miniature computer controlled drive motor operatively connected with one of the light source and the lens for displacement of the light source or the lens, respectively, in one of two mutually perpendicular directions for adjustment of the location of the light spot on the reflecting surface when observed from a defined fixed position;
   wherein said miniature computer controlled drive motor comprises a piezoelectric element.

2. The weapon sight of claim 1 further comprising a second miniature computer controlled drive motor operatively connected with one of the light source or the lens, for displacement of the light source or the lens, respectively, in the other one of said two mutually perpendicular directions.

3. The weapon sight of claim 2 wherein said second miniature computer controlled drive motor comprises a piezoelectric element.

4. The weapon sight of claim 2 wherein said second miniature computer controlled drive motor comprises a magnetostrictive element.

5. The weapon sight of claim 2 wherein said second miniature computer controlled drive motor comprises a stepping motor.

6. The weapon sight of claim 1 wherein the light source comprises a light emitting diode array extending in the other one of said two mutually perpendicular directions.

* * * * *